United States Patent
Paczkowski et al.

(10) Patent No.: US 9,906,961 B2
(45) Date of Patent: Feb. 27, 2018

(54) COMPUTER SYSTEM HARDWARE VALIDATION FOR VIRTUAL COMMUNICATION NETWORK ELEMENTS

(71) Applicant: Sprint Communications Company L.P., Overland Park, KS (US)

(72) Inventors: Lyle Walter Paczkowski, Mission Hills, KS (US); Arun Rajagopal, Leawood, KS (US); Ronald R. Marquardt, Woodinville, WA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/653,101

(22) Filed: Jul. 18, 2017

(65) Prior Publication Data

US 2017/0318466 A1 Nov. 2, 2017

Related U.S. Application Data

(63) Continuation of application No. 14/600,250, filed on Jan. 20, 2015, now Pat. No. 9,743,282.

(51) Int. Cl.
| | |
|---|---|
| *H04M 1/66* | (2006.01) |
| *H04M 1/68* | (2006.01) |
| *H04M 3/16* | (2006.01) |
| *H04W 12/08* | (2009.01) |
| *H04L 29/06* | (2006.01) |
| *H04L 9/32* | (2006.01) |
| *H04W 8/26* | (2009.01) |
| *G06F 9/455* | (2018.01) |

(52) U.S. Cl.
CPC ........ *H04W 12/08* (2013.01); *G06F 9/45533* (2013.01); *G06F 9/45558* (2013.01); *H04L 9/32* (2013.01); *H04L 63/10* (2013.01); *H04L 63/20* (2013.01); *H04W 8/26* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,889,734 B1 | 2/2011 | Hendel et al. |
| 7,987,464 B2 | 7/2011 | Day et al. |
| 8,250,572 B2 | 8/2012 | Dahlstedt |
| 8,494,576 B1 | 7/2013 | Bye et al. |
| 8,504,097 B1 | 8/2013 | Cope et al. |
| 8,649,770 B1 | 2/2014 | Cope et al. |

(Continued)

FOREIGN PATENT DOCUMENTS

WO 2014138148 9/2014

*Primary Examiner* — Idowu O Osifade

(57) ABSTRACT

A data communication network has computer system hardware. The data communication network processes a virtual network element in the computer system hardware to forward data communications for multiple Uniform Resource Identifiers (URIs). The data communication network individually associates the virtual network element with the multiple URIs. The data communication network processes a hardware-embedded code in the computer system hardware to identify the computer system hardware for the virtual network element. The data communication network validates the computer system hardware for the virtual network element, and when the validation fails, the data communication network transfers hardware alarms for the multiple URIs associated with the virtual network element.

20 Claims, 13 Drawing Sheets

(56) References Cited

U.S. PATENT DOCUMENTS

| | | | |
|---|---|---|---|
| 8,667,607 | B2 | 3/2014 | Paczkowski et al. |
| 8,752,160 | B1 | 6/2014 | Delker et al. |
| 8,819,447 | B2 | 8/2014 | Shipley et al. |
| 9,355,007 | B1 | 5/2016 | Eicher |
| 2006/0168655 | A1 | 7/2006 | Grandmaitre et al. |
| 2009/0328193 | A1 | 12/2009 | Moore et al. |
| 2010/0165877 | A1 | 7/2010 | Shukla et al. |
| 2010/0311401 | A1 | 12/2010 | Oh et al. |
| 2011/0075557 | A1 | 3/2011 | Chowdhury et al. |
| 2011/0189971 | A1 | 8/2011 | Faccin et al. |
| 2012/0023554 | A1 | 1/2012 | Murgia et al. |
| 2012/0151209 | A1 | 6/2012 | Visnyak et al. |
| 2013/0345530 | A1 | 12/2013 | McRoberts et al. |
| 2014/0047548 | A1 | 2/2014 | Bye et al. |
| 2014/0201374 | A1 | 7/2014 | Ashwood-Smith et al. |
| 2014/0229945 | A1 | 8/2014 | Barkai et al. |

# COMPUTER SYSTEM HARDWARE VALIDATION FOR VIRTUAL COMMUNICATION NETWORK ELEMENTS

RELATED CASES

This patent application is a continuation of U.S. patent application Ser. No. 14/600,250 that was filed on Jan. 20, 2015 and that is entitled "COMPUTER SYSTEM HARDWARE VALIDATION FOR VIRTUAL COMMUNICATION NETWORK ELEMENTS." U.S. patent application Ser. No. 14/600,250 is hereby incorporated by reference into this patent application.

TECHNICAL BACKGROUND

Data communication networks operate computer systems to provide various data services. The data services include internet access, media conferencing, file access, messaging, content delivery, and the like. The computer systems process virtual network elements to forward data packets for the data services. The different data services are associated with the virtual network elements that provide their services. The different data services are also associated with Access Point Names (APNs), Uniform Resource Identifiers (URIs), and other service metadata. In some data communication networks, the computer systems are located at different physical sites.

The virtual network elements include virtual networking machines such as a: Mobility Management Entity (MME), Service Gateway (S-GW), Packet Data Network Gateway (P-GW), Policy Charging and Rules Function (PCRF), Home Subscriber System (HSS), Baseband Processing Unit (BBU), Radio Resource Control (RRC) processor, Radio Link Control (RLC) processor, Packet Data Convergence Protocol (PDCP) processor, Media Access Control (MAC) processor, Residential Gateway (R-GW), Set-Top Box (STB), Dynamic Host Control Protocol (DHCP) server, Network Address Translation (NAT) firewall, Border Controller (BC), Load Balancer (LB), media server, and network accelerator.

The computer systems employ hypervisor software and context switching circuitry to distribute the execution of the virtual network elements across various processing time cycles. The processing time cycles each have a repeating set of dedicated processing times. The context switching provides the executing virtual network element with its own context data while usually hiding the context data of the other processing time cycles. Some network elements execute during mutually exclusive processing time cycles with context switching to maintain physical isolation. The virtual network elements are installed, executed, and transferred as new data services and networking technologies are implemented. A complex and dynamic virtual network element environment is the result.

The computer systems are also equipped with trust mode systems. The trust mode systems maintain physical separation between the trust mode hardware and software components and other open mode hardware and software components. The trust mode systems allow interaction between open and trusted components through secure bus interfaces, memories, and switching circuits. The trust mode systems build trust with one another by using shared secret keys to exchange random numbers and hash results. Unfortunately, these trust mode systems have not been effectively and efficiently integrated within this complex and dynamic virtual network element environment.

TECHNICAL OVERVIEW

A data communication network has computer system hardware. The data communication network processes a virtual network element in the computer system hardware to forward data communications for multiple Uniform Resource Identifiers (URIs). The data communication network individually associates the virtual network element with the multiple URIs. The data communication network processes a hardware-embedded code in the computer system hardware to identify the computer system hardware for the virtual network element. The data communication network validates the computer system hardware for the virtual network element, and when the validation fails, the data communication network transfers hardware alarms for the multiple URIs associated with the virtual network element.

DETAILED DESCRIPTION

Figure 1:
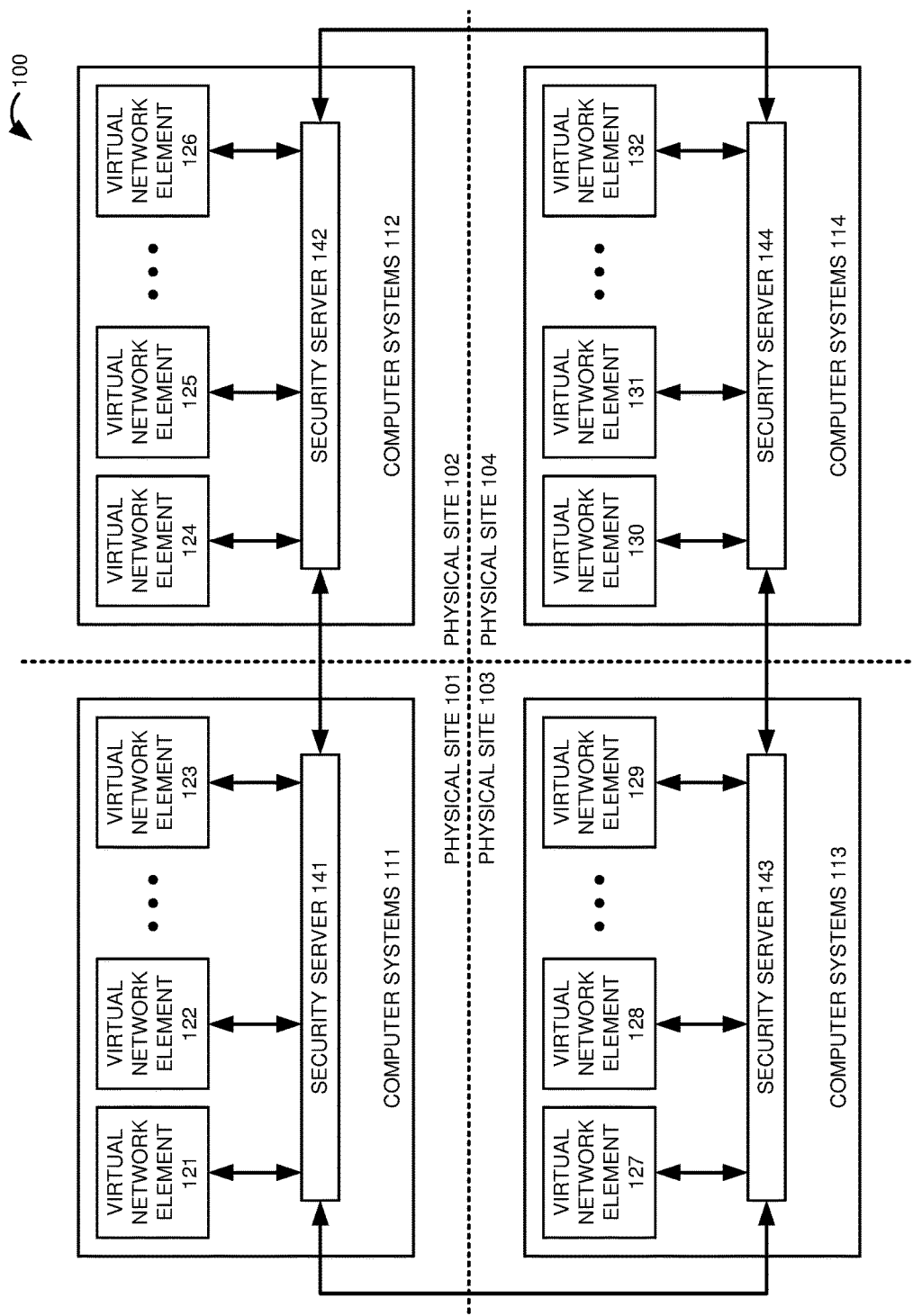
FIGS. 1-3 illustrate a communication system to validate computer system identities for virtual network elements.
Figure 2:
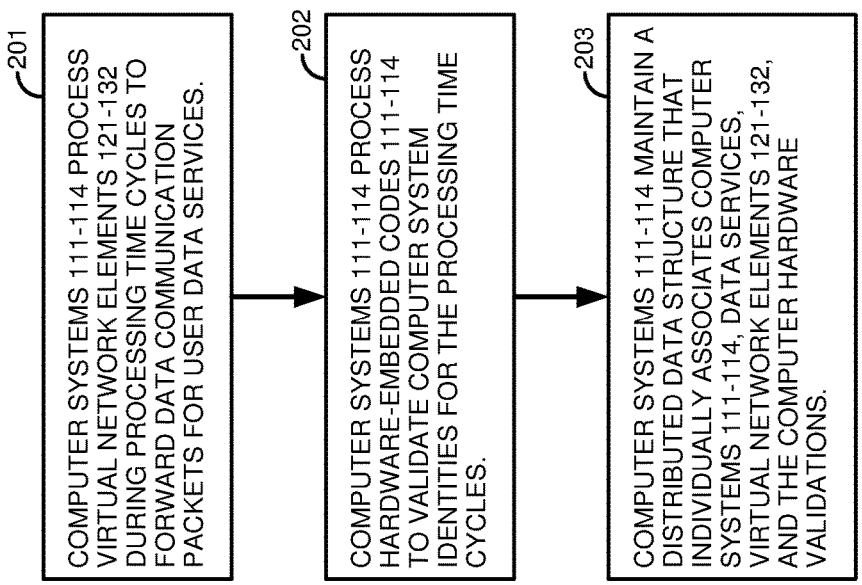
Figure 3:
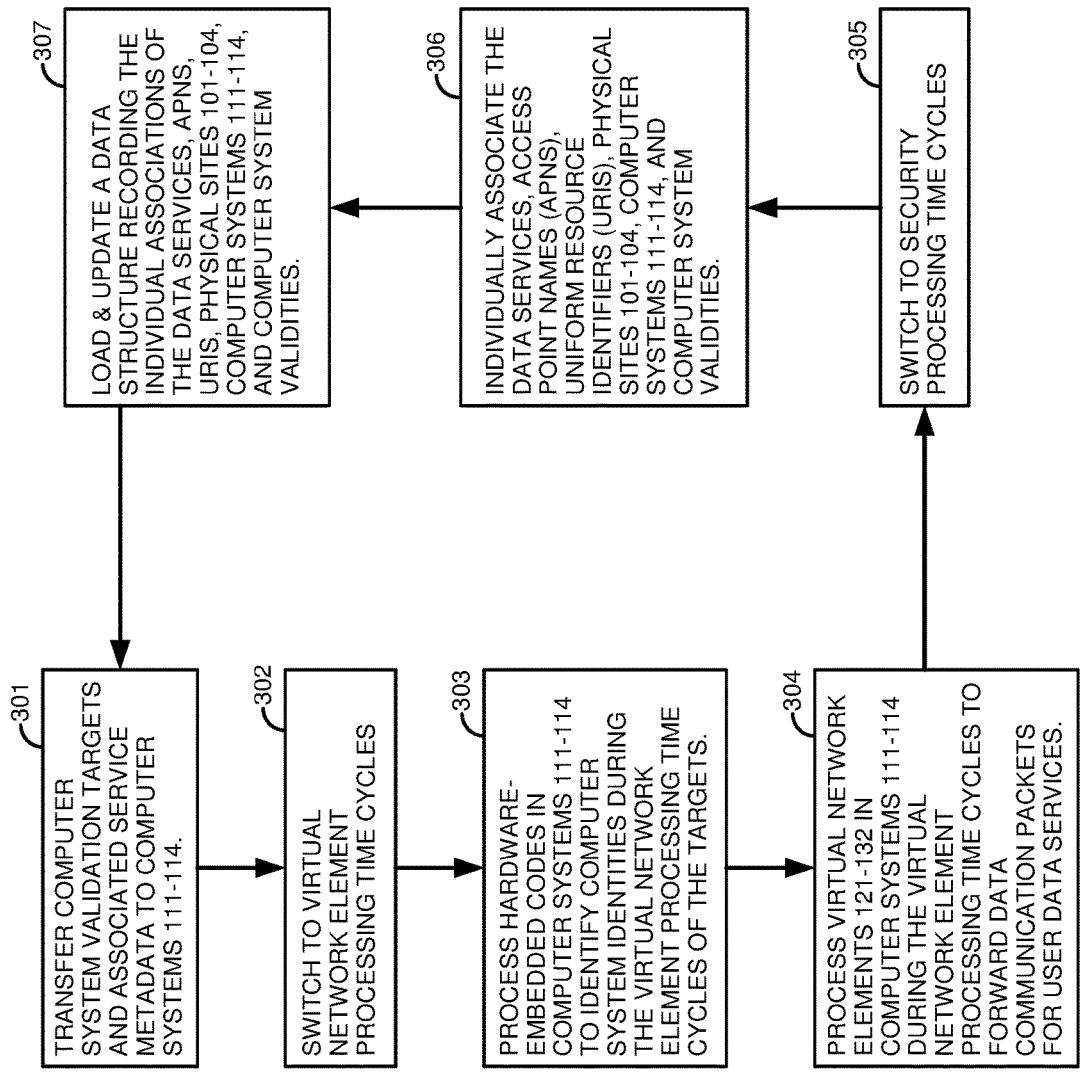

FIGS. 1-3 illustrate communication system 100 to validate computer system identities based on virtual network elements 121-132. Communication system 100 comprises computer systems 111-114 that are located at respective physical sites 101-104. Physical sites 101-104 represent data centers, base stations, aggregation hubs, enterprises, residences, or some other geographic computer location. In alternative examples, computer systems 111-114 may be located at a single physical site or numerous physical sites. The number (4) of physical sites 101-104 in communication system 100 is exemplary.

Computer systems 111-114 comprise computer and communications circuitry, software, and memory. Computer systems 111-114 execute respective virtual network elements 121-123, 124-126, 127-129, and 130-132. Computer systems 111-114 also include respective security servers 141-144 that are operationally coupled over secure communication links and systems. In some examples, security servers 111-114 comprise server blades, hypervisors, virtual servers, and virtual distributed databases. In some examples, security servers 111-114 implement trust mode systems to initiate, protect, and validate trusted processing circuitry, communication interfaces, and the like.

Virtual network elements 121-132 comprise software virtual machines that are configured for time-sliced data processing environments. When executed during the processing time cycles, virtual network elements 121-132 forward data packets for network users to provide various data communication services, such as internet access, media conferencing, media streaming, messaging, gaming, machine control, and the like. An exemplary list of virtual network elements includes: Mobility Management Entity (MME), Service Gateway (S-GW), Packet Data Network Gateway (P-GW), Policy Charging and Rules Function (PCRF), Home Subscriber System (HSS), eNodeB, Baseband Processing Unit (BBU), Radio Resource Control (RRC) processor, Radio Link Control (RLC) processor, Packet Data Convergence Protocol (PDCP) processor, Media Access Control (MAC) processor, Residential Gateway (R-GW), femtocell, Set-Top Box (STB), Dynamic Host Control Protocol (DHCP) server, Network Address Translation (NAT) firewall, border controller, load balancer, media server, network accelerator, or some other type of communication data processing module.

During the network processing time cycles, computer systems 111-114 process virtual network elements 121-132 to forward the data communication packets for the users. During the network processing time cycles, computer systems 111-114 also process internal hardware-embedded codes to identify the computer systems. Computer systems 111-114 process the codes to validate the computer system identities for virtual network elements 121-132. This hardware validation may occur during the virtual network element processing time cycles or during some other contemporaneous processing time cycles. This hardware validation may also use trust mode systems to perform the hardware validation.

Computer systems 111-114 maintain a distributed data structure that individually associates the data services, computer systems, virtual network elements, and the computer hardware validities. The database maintenance may occur during the network processing time cycles, during other processing time cycles, or in another computer in the system.

In some examples, computer systems 111-114 individually associate the data services with the network processing time cycles based on associations with virtual network elements 121-132. The data services are pre-associated with the virtual network elements 121-132 by network systems and/or technicians during service deployment. Virtual network elements 121-132 are associated with computer systems 111-114 and the network processing time cycles during software installation and execution.

In a like manner, computer systems 111-114 may individually associate Access Point Names (APNs) and/or Uniform Resource Indicators (URIs) with the network processing time cycles based on associations with virtual network elements 121-132. The APNs and URIs are pre-associated with virtual 121-132 network elements by network systems and/or technicians during service configuration. In addition, computer systems 111-114 may individually associate physical sites 101-104 with the data services, APNs and URIs, and the computer system validities based on associations between the virtual network elements 121-132 and physical sites 101-104 as indicated by the installation and execution of the virtual network element software.

Referring to FIG. 2, computer systems 111-114 are described. During processing time cycles, computer systems 111-114 process virtual network elements 121-132 to forward data communication packets for user data services (201). For example, virtual network elements 124-125 might transcode and route a video packet for subsequent delivery to a wireless phone. Computer systems 111-114 also process internal hardware-embedded codes to validate computer system identities for the processing time cycles (202). For example, security server 144 may direct computer system 114 to read a hardware ID code from a Read Only Memory (ROM) and compare the ID to an authorized computer system list. Security server 144 might direct computer system 114 to read a Global Positioning Satellite (GPS) transceiver and compare the GPS coordinates to an authorized computer system coordinate list. Security server 144 might direct computer system 114 to receive an encrypted Radio Frequency (RF) tag and compare the RF data to an authorized computer system code list.

The validation may entail a random number challenge and hash response that occur during different processing time cycles from the network element processing time cycles. Computer systems 111-114 maintain a distributed data structure that individually associates the data services, the computer systems, the virtual network elements, and the computer system validities (203). The database maintenance may occur during the network element processing time cycles, during other processing time cycles, or in another computer system.

Referring to FIG. 3, an alternative operation of computer systems 111-114 is described. During security processing time cycles, a network security server transfers hardware validation targets and associated data service metadata to computer systems 111-114 (301). The validation targets and associated service metadata include associations of data services, APNs, URIs, and the like. Computer systems 111-114 context switch from the security processing time cycles to network element processing time cycles (302).

Computer systems 111-114 process internal hardware-embedded codes to validate computer system identities during the initial network element processing time cycles (303). Computer systems 111-114 also process virtual network elements 121-132 to forward data communication packets for user data services during the network element processing time cycles (304). Computer systems 111-114 then context switch from the network element processing time cycles to the security processing time cycles (305).

During the security processing time cycles, computer systems 111-114 individually associate the data services, APN, URIs, physical sites 101-104, computer systems 111-114, virtual network elements 121-132, and the computer system validities (306). The associations are based on server data, service data, network data, and the site/system/time of the virtual network element installation and execution. Computer systems 111-114 maintain a distributed data structure that individually associates the data services, APNs, URIs, physical sites 101-104, computer systems 111-114, virtual network elements 121-132, and the computer system validities (307). The operation then repeats with new hardware validation targets.

Figure 4:
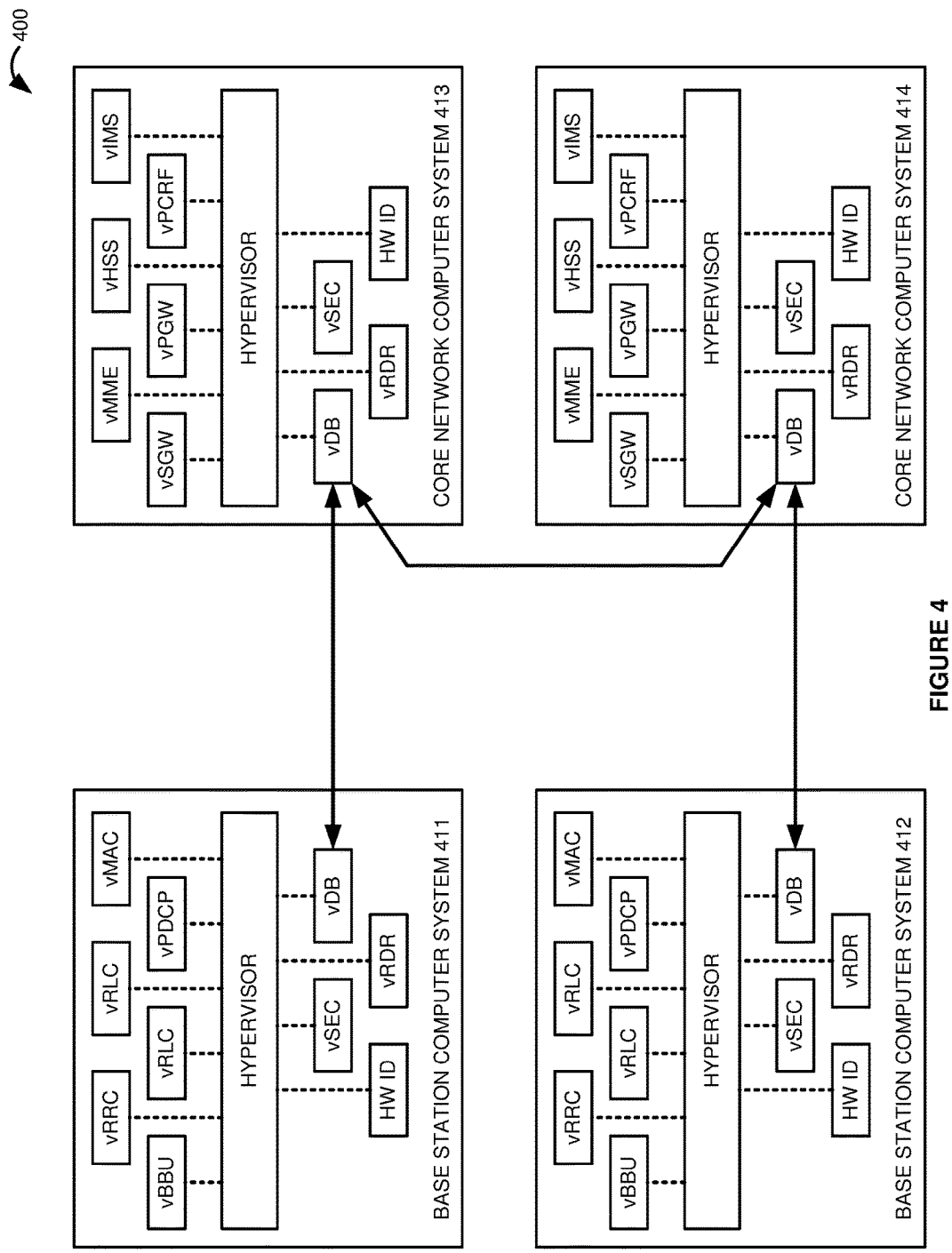
FIG. 4 illustrates a wireless communication system to validate computer system identities for virtual network elements.

FIG. 4 illustrates wireless communication system 400 to validate computer system identities for virtual network elements. Wireless communication system 400 is an example of communication system 100, although system 100 may use alternative configurations and operations. Communication system 400 comprises base station computer systems 411-412 and core network computer systems 413-414. Computer systems 411-414 execute hypervisor software to operate its processing circuitry in a virtualized time-sliced manner.

Computer systems 411-414 include various virtual network elements. Base station computer systems 411-412 include one or more of a: virtual Baseband Processing Unit (vBBU), virtual Radio Resource Control processor (vRRC), virtual Radio Link Control processor (vRLC), virtual Packet Data Convergence Protocol processor (vPDCP), virtual Media Access Control processor (vMAC), virtual Security server (vSEC), virtual code Reader (vRDR), and virtual Database (vDB). Core network computer systems 413-414 include one or more of a: virtual Mobility Management Entity (vMME), virtual Service Gateway (vSGW), virtual Packet Data Network Gateway (vPGW), virtual Policy Charging and Rules Function (vPCRF), virtual Home Subscriber System (vHSS), virtual Security server (vSEC), virtual code Reader (vRDR), and virtual Database (vDB). The vDBs exchange data over secure data links to maintain a distributed data structure.

During security processing time cycles, the vSECs transfer the virtual network element targets for hardware validation to the hypervisors. The hypervisors process their execution schedules to identify the upcoming network processing time cycles for the virtual network element targets. The hypervisors eventually switch context from the vSECs processing time cycles to network processing time cycles.

During the network processing time cycles for the target virtual network elements, the hypervisors process the vRDRs to obtain internal hardware-embedded codes to identify computer systems 411-414 during the network processing time cycles. For example, the vRDRs may utilize trust mode circuitry and switching to isolate and read a Hardware Identifier (HW ID) from a trusted ROM and to read GPS coordinates form a trusted GPS receiver. During the network processing time cycles for the target virtual network elements, the hypervisors also process the virtual network elements to forward data communication packets for user data services. Base station computer systems 411-412 execute the vBBUs, vRRCs, vRLCs, vPDCPs, and vMACs. Core network computer systems 413-414 execute the vMMEs, vSGWs, vPGWs, vPCRFs, and vHSSs.

The hypervisors switch the context from the network processing time cycles back to the security processing time cycles. During the security processing time cycles, the hypervisors execute the vSECs to validate the HW IDs. The verification compares the obtained HW ID with the expected HW ID based on the software installation and execution records. During the security processing time cycles, the hypervisors execute the vDBs to individually associate the data services, APN, URIs, physical sites, computer systems, virtual network elements, and computer system validities. The associations are based on server data, service topology data, and the site/system/time of the virtual network element installation and execution. During the security processing time cycles, the hypervisors also execute the vDBs to maintain a distributed data structure that individually associates the data services, APNs, URIs, physical sites, computer systems, virtual network elements, and the computer system validities.

The vDBs exchange data over secure data links to maintain a distributed data structure—typically hosted in core network computer systems 413-414. The distributed database may be queried and sorted by data service, APN, URI, physical site, computer system, and virtual network element to discover related data and computer system validities. For example, the database may be queried to identify all virtual network elements for a given APN and their current site as validated by system 400.

Figure 5:
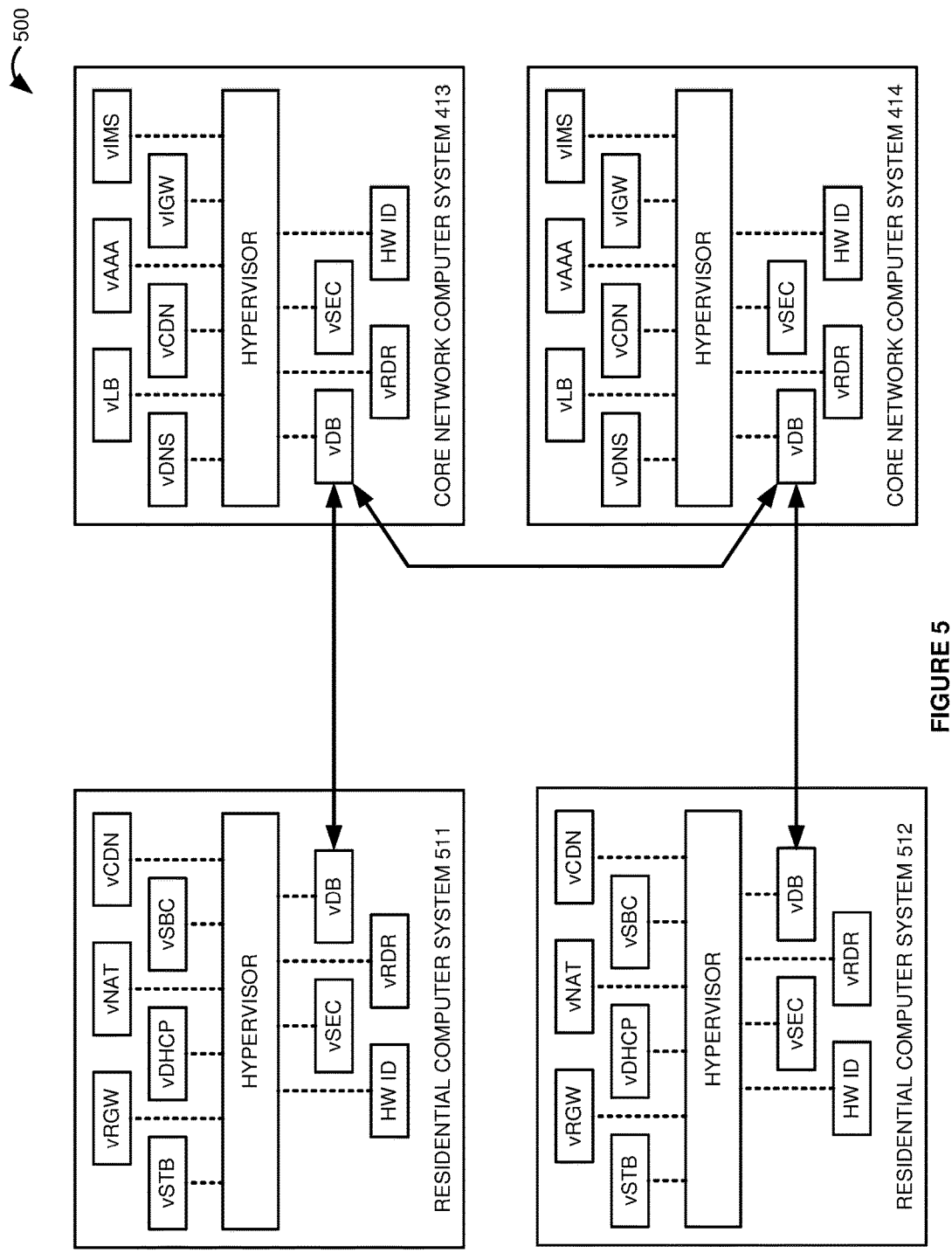
FIG. 5 illustrates a residential communication system to validate computer system identities for virtual network elements.
Figure 6:
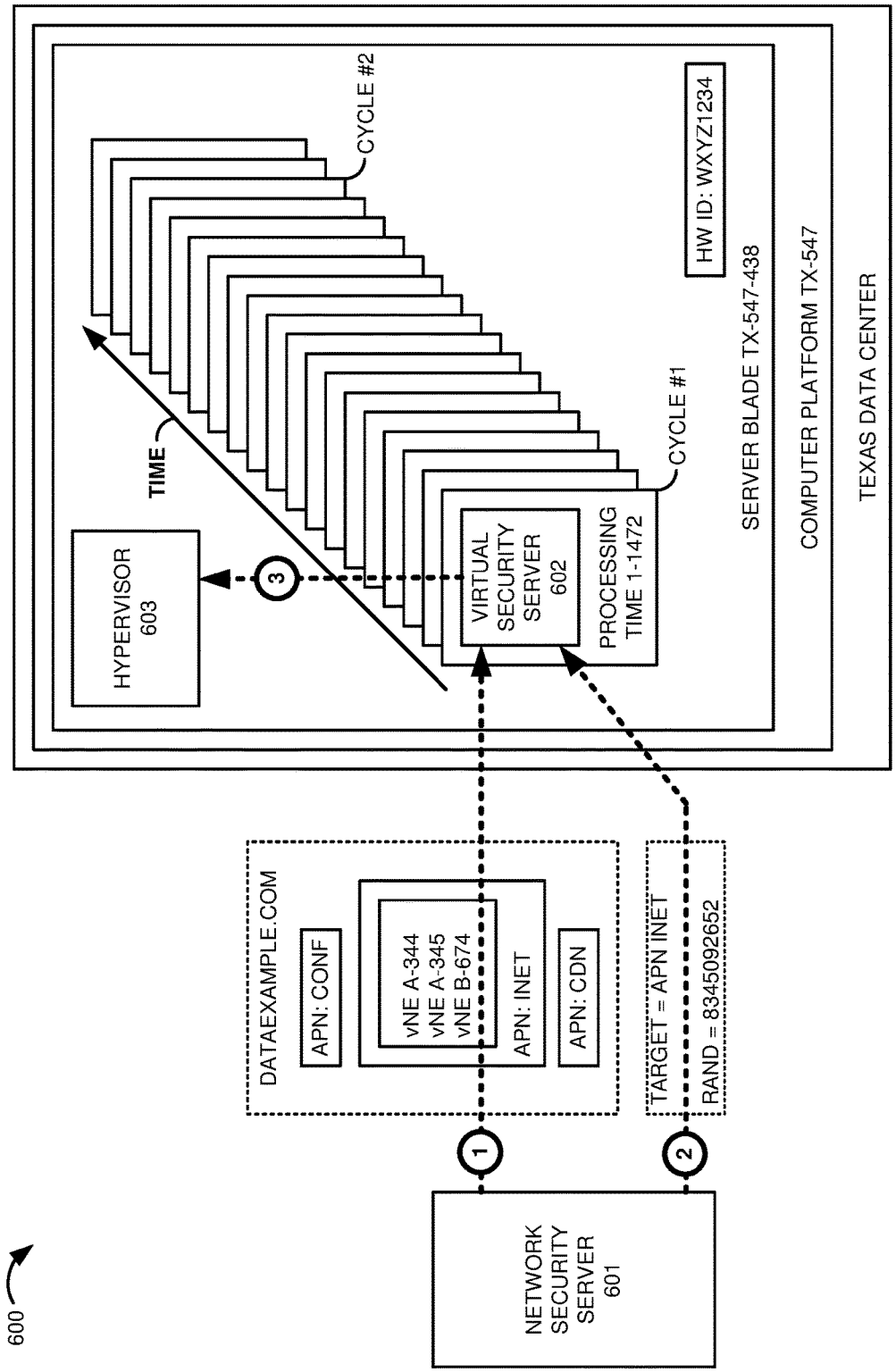
FIGS. 6-10 illustrate a communication system to validate hardware for executing virtual network elements at various data centers.

FIG. 5 illustrates residential communication system 500 to validate computer system identities for virtual network elements. Residential communication system 500 is an example of communication system 100, although system 100 may use alternative configurations and operations. Communication system 500 comprises residential computer systems 511-512 and core network computer systems 513-514. Computer systems 511-514 execute hypervisor software to operate its processing circuitry in a virtualized time-sliced manner.

Computer systems 511-514 include various virtual network elements. Residential computer systems 511-512 include one or more of a: virtual Set-Top Box (vSTB), virtual Residential Gateway (vRGW), virtual Dynamic Host Control Protocol server (vDHCP), virtual Network Address Translation firewall (NAT), virtual Session Border Controller (vSBC), virtual Content Delivery Network (vCDN), virtual Security server (vSEC), virtual code Reader (vRDR), and virtual Database (vDB). Core network computer systems 513-514 include one or more of a: virtual Domain Name System server (vDNS), virtual Load Balancer (vLB), vCDN, virtual Authentication, Authorization, and Accounting server (vAAA), virtual Internet Gateway (vIGW), and virtual Internet Multimedia Subsystem (vIMS), virtual Security server (vSEC), virtual code Reader (vRDR), and virtual Database (vDB). The vDBs exchange data over secure data links to maintain a distributed data structure.

During security processing time cycles, the vSECs transfer the virtual network element targets for hardware validation to the hypervisors. The hypervisors process their execution schedules to identify the upcoming network processing time cycles for the virtual network element targets. The hypervisors eventually switch context from the vSECs processing time cycles to network processing time cycles.

During the network processing time cycles for the target virtual network elements, the hypervisors process the vRDRs to obtain internal hardware-embedded codes to identify computer systems 511-514 during the network processing time cycles. For example, the vRDRs may utilize trust mode circuitry and switching to isolate and read a Hardware Identifier (HW ID) from a trusted ROM and read GPS coordinates from a trusted GPS receiver. During the network processing time cycles for the target virtual network elements, the hypervisors also process the virtual network elements to forward data communication packets for user data services. Residential computer systems 511-512 execute the vSTBs, vRGWs, vDHCPs, vNATs, vSBCs, and vCDNs. Core network computer systems 513-514 execute the vDNSs, vLBs, vCDNs, vAAAs, vIGWs, and vIMSs.

The hypervisors switch the context from the network processing time cycles back to the security processing time cycles. During the security processing time cycles, the hypervisors execute the vSECs to validate the HW IDs. The verification compares the obtained HW ID with the expected HW ID based on the software installation and execution records. During the security processing time cycles, the hypervisors execute the vDBs to individually associate the data services, APN, URIs, physical sites, computer systems, virtual network elements, and computer system validities. The associations are based on server data, service topology data, and the site/system/time of the virtual network element installation and execution. During the security processing time cycles, the hypervisors also execute the vDBs to maintain a distributed data structure that individually associates the data services, APNs, URIs, physical sites, computer systems, virtual network elements, and the computer system validities.

The vDBs exchange data over secure data links to maintain a distributed data structure—typically hosted in core network computer systems 513-514. The distributed database may be queried and sorted by data service, APN, URI, physical site, computer system, and virtual network element to discover related data and computer system validities. For example, the database may be queried to identify all virtual network elements for a given URI and their current site as validated by system 500.

FIGS. 6-10 illustrate communication system 600 to validate computer system hardware for executing virtual network elements at various data centers. Computer system 600 comprises network security server 601, virtual security server 602, and hypervisor 603. In this example, network security server 601 is a physically discrete computer system from the servers that execute virtual security server 602 and hypervisor 603. In other examples, network security server 601 operates on the same servers as virtual security server 602 and hypervisor 603—typically during a trusted processing time cycle. Network security server 601 may be at least partially integrated with hypervisor 603.

As indicated by the arrow, time proceeds into the page and the processing times are broken into processing time cycles #1, #2, #3, and so on. The current processing time is 1-1472 in processing time cycle #1. For clarity, the number of processing times per cycle has been restricted. Also note that the operations of FIGS. 6-10 do not happen during a single processing time but occur contemporaneously with the indicated processing time.

In a first operation, network security server 601 transfers associated service data to virtual security server 602. The service data indicates associations between data services, APNs, URIs, and virtual network elements. The service data is generated during service deployment and may be modified over time as virtual network elements are added, deleted, or moved. Virtual security server 602 uses the service data to identify hardware validation targets and to update a distributed database.

In a second operation, network security server 601 transfers a hardware validation target and random number to virtual security server 602. In this example, the validation target is an APN, but it could be a service, URI, site, computer, virtual machine, or the like. Virtual security server 602 processes its distributed database (including aggregated and associated service and network data) to identify the virtual network elements associated with the target. In this example, the target APN INET is associated with vNEs A-344, A-345, and B-674 that are executing in the Dallas data center. Note that the vNEs need not all execute at the same site or computer. In addition, the targeting information may be distributed among multiple virtual security servers at various sites to reach the appropriate security servers at the desired sites.

In a third operation, virtual security server 602 transfers target data to hypervisor 603 indicating target vNEs A-344, A-345, and B-674 and random number 8345092652. In response, hypervisor 603 processes its internal schedule to identify the upcoming processing time cycles for vNEs A-344, A-345, and B-674. In this example, vNE A-345 will execute in upcoming processing time cycle #2. In some examples, virtual security server 602 is at least partially integrated with hypervisor 603.

Figure 7:
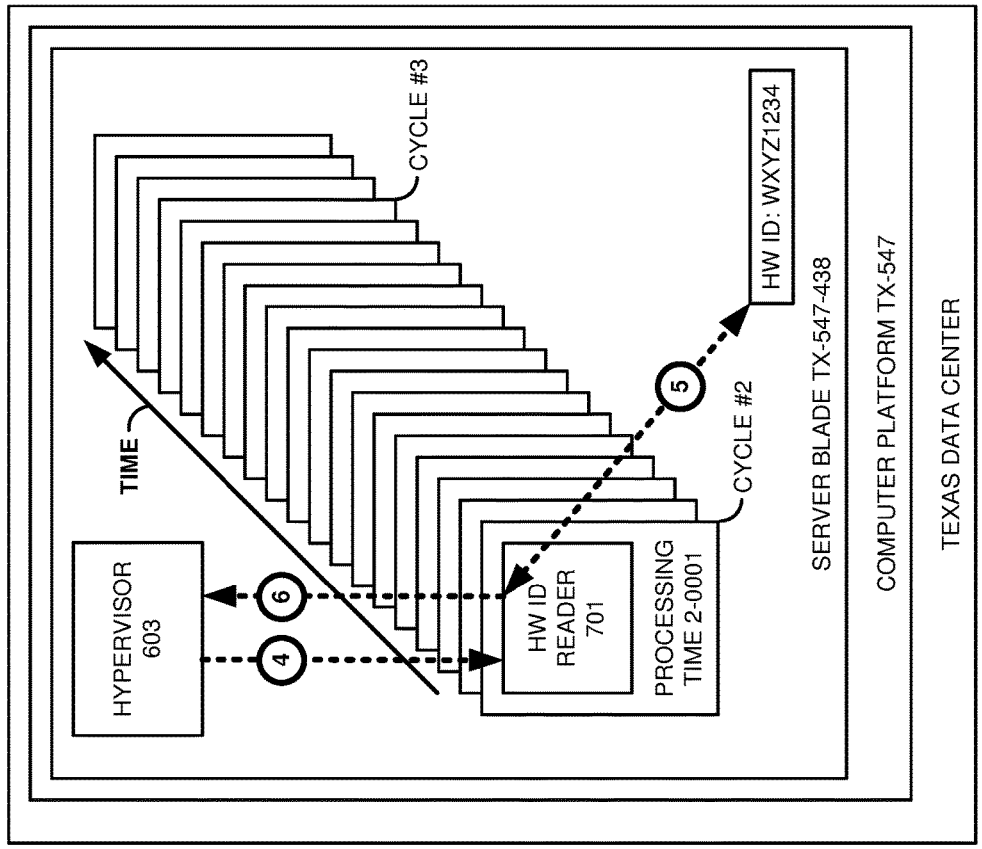

Referring to FIG. 7 and in a fourth operation, hypervisor 603 executes Hardware Identification (HW ID) reader 701 at the beginning of processing time cycle #2 in response to the targeting data from virtual security server 602 and the scheduled execution of target vNE A-345 in time cycle #2. Hypervisor 603 transfers random number 8345092652 to HW ID reader 701 during the launch. In some examples, HW ID reader 701 is at least partially integrated with hypervisor 603.

In a fifth operation, HW ID reader 701 retrieves HW ID WXYX1234 embedded within server blade TX-547-438—possibly from a ROM. Typically, HW ID reader 701 interacts with trusted security zone components in the server blade to obtain the HW ID. As directed by hypervisor 603, the trusted security zone components may only expose the HW ID to other trusted components during the execution of HW ID reader 701. The trusted security zone components would isolate untrusted systems from the HW ID transfer path. In some examples, HW ID reader 702 also retrieves and associates other data in a similar fashion like GPS coordinates, time of day, Radio Frequency (RF) IDs, hypervisor data, server blade status, and the like. HW ID reader 701 processes random number 8345092652 and HW ID WXYX1234 to generate a hash result. Various one-way hash algorithms could be used.

In a sixth operation, HW ID reader 701 transfers the hash result of random number 8345092652 and HW ID WXYX1234 to hypervisor 603

Figure 8:
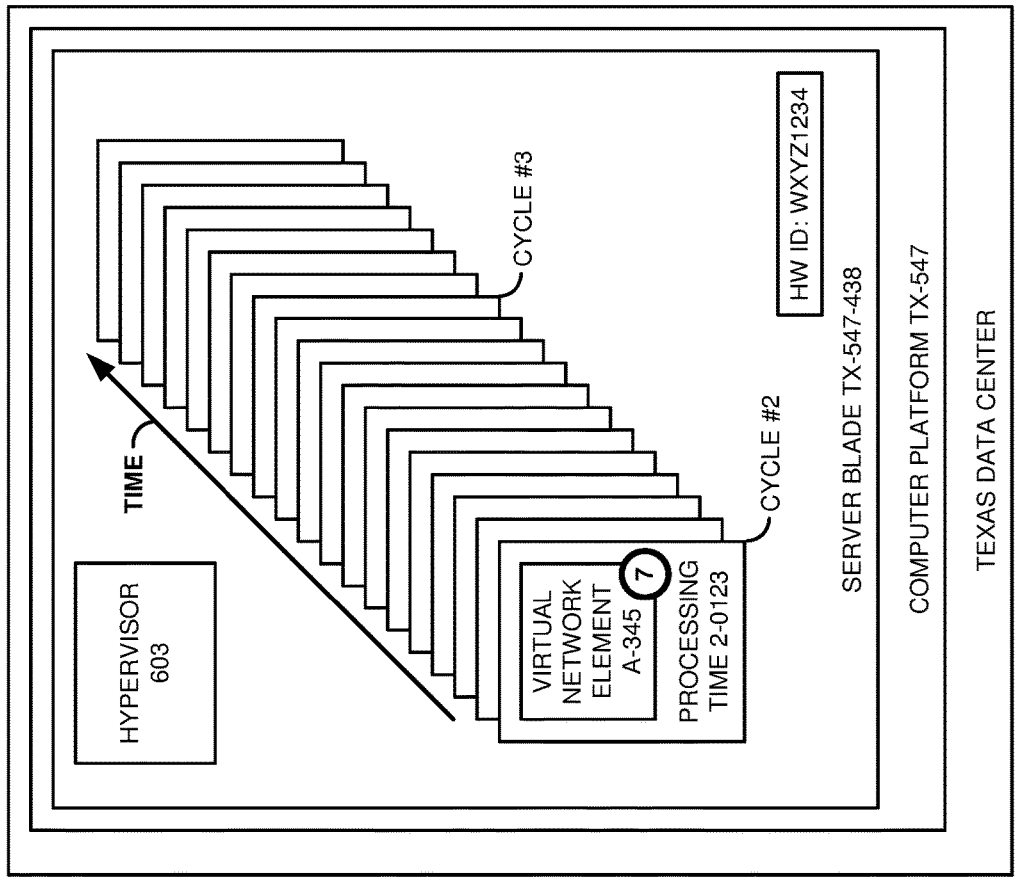

Referring to FIG. 8 and in a seventh operation, server blade TX-547-438 executes vNE A-345 during processing time cycle #2 under the direction of hypervisor 603. Typically, hypervisor 602 performs context switching operations between the execution of HW ID reader 701 and vNE A-345 during processing time cycle #2. Thus, processing time cycle #2 comprises virtual cycles #2A and #2B with a trusted context switch in between.

Figure 9:
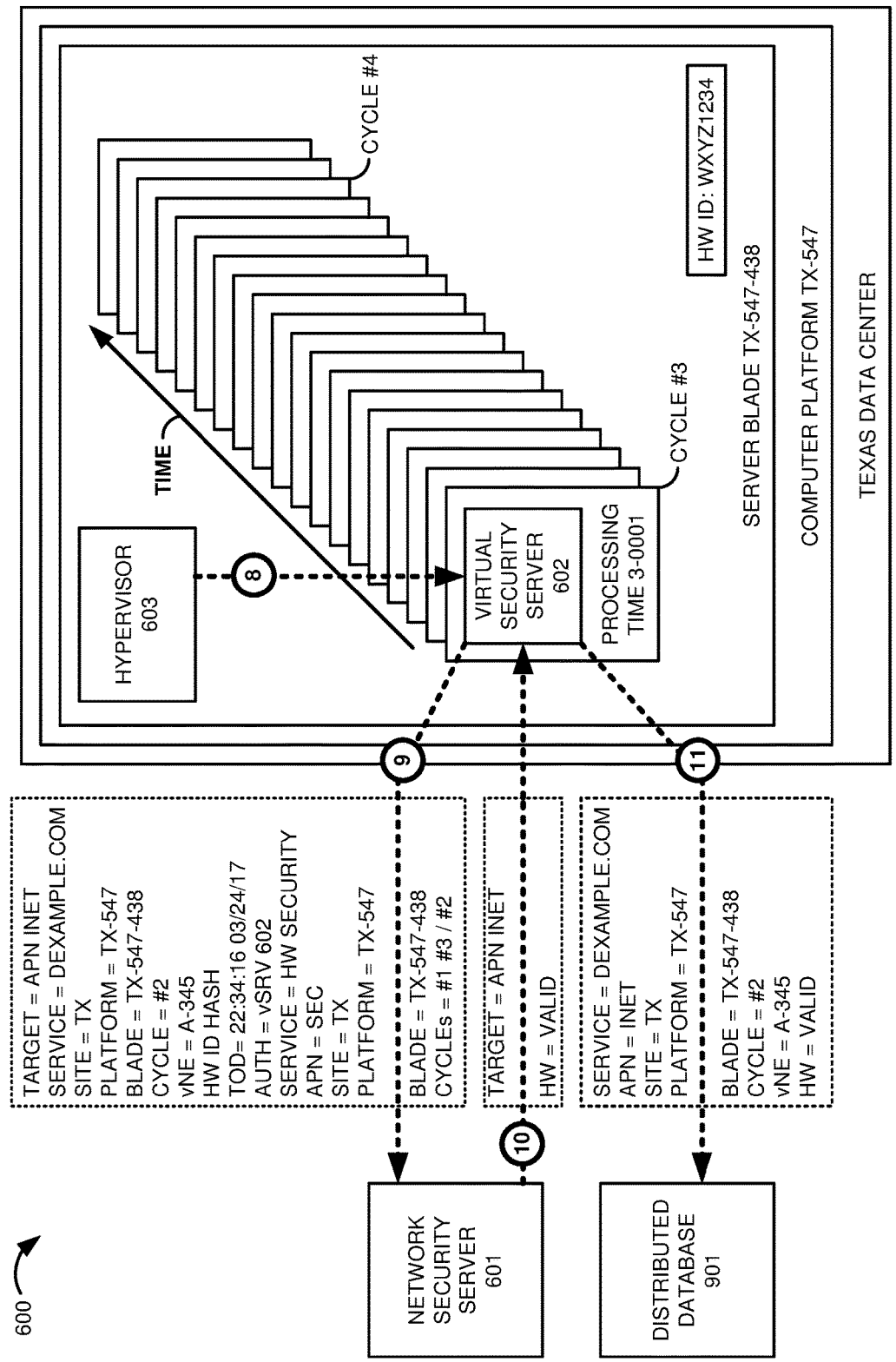

Referring to FIG. 9 and in an eighth operation, hypervisor 603 executes virtual security server 602 during time cycle #3. During execution, hypervisor 605 transfers the hash result of random number 8345092652 and HW ID WXYX1234 to virtual security server 602.

In an alternative to some of the operations 3, 4, 6 and 8 where the random number and hash result are passed through hypervisor 603, the random number and hash result could be passed between virtual security server 602 and HW reader 701 through a trusted shared memory. Hypervisor 603 would then identify processing time cycles for targeted vNEs and initiate HW reader 701 at the proper times within the identified processing time cycles.

In a ninth operation, virtual security server 602 transfers a data set for the target APN INET to network security server 601. The data set indicates the associated service, site, platform, blade, cycle, vNE, hash result, time of day, authorizing virtual server, authorizing service, authorizing APN, authorizing site, authorizing platform, authorizing blade, and the authorizing cycle. The information may also indicate the random number or some other security transaction code.

In a similar manner, hypervisor 603 would execute HW ID reader 702 in appropriate time cycles to gather additional hash results for the other virtual network elements associated with APN INET. Likewise, other hypervisors may execute their own HW ID readers in the appropriate time cycles to gather more hash results for the various additional virtual network elements associated with APN INET.

In a tenth operation, network security server 601 processes the hash result against its own internally generated hash result to validate HW ID WXYZ1234 for vNE A-345 of the APN INET. Network security server 601 would process other hash results in a like manner to validate other HW IDs for the other vNEs that support APN INET. Network security server 601 transfers validation data to virtual security server 602 indicating the hardware validation status for the target APN INET. Had any hardware validation failures occurred, then network security server

601 would provide data associating the hardware validation failure with the failed service, site, platform, blade, cycle, vNE, and the like.

In an eleventh operation, virtual security server 602 transfers a data set to distributed database 901 indicating the service DEXAMPLE.COM, and its associated APN INET. For APN INET, the data set indicates the related sites, platforms, blades, vNEs, time cycles, and current hardware validity status. Likewise, other virtual security servers may transfer their own data sets associated with APN INET. Had any hardware validation failures occurred, then virtual security server 602 or the other servers would provide data indicating the associated service, site, platform, blade, vNE, cycle, and the like. In this example, distributed database 901 is a physically discrete computer system from the servers that execute virtual security server 602 and hypervisor 603. In other examples, distributed database 901 operates on the same servers as virtual security server 602 and hypervisor 603—typically during a trusted processing time cycle. Distributed database 901 may be at least partially integrated with hypervisor 603.

Figure 10:
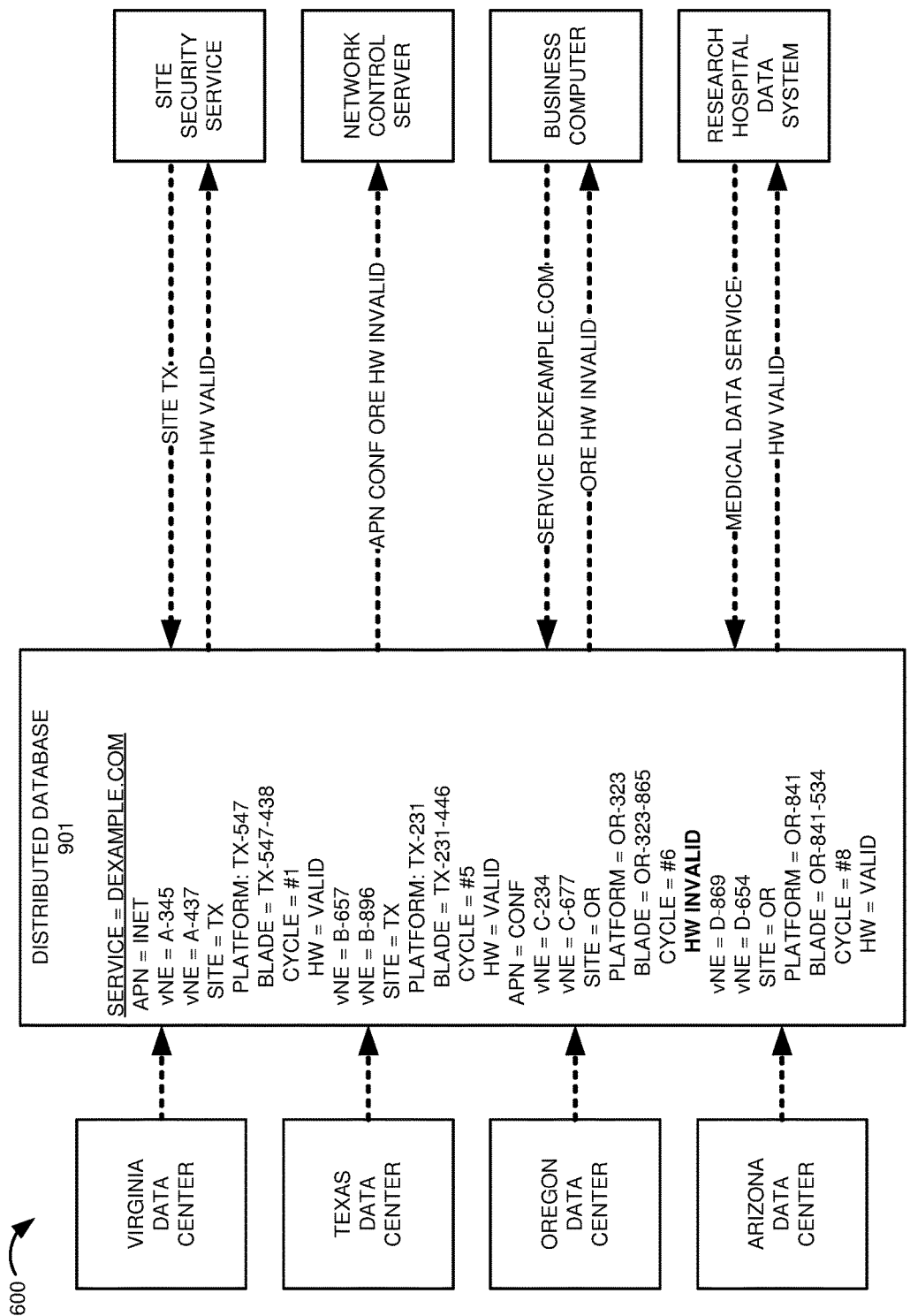

Referring to FIG. 10, distributed database 901 hosts various data sessions for entities, such as security services, network servers, business computers, research hospitals, and the like. Distributed database 901 collects and associates data from various data centers for various services as described above. Distributed database 901 receives various queries and hosts various alarm triggers.

Distributed database 901 receives a query from the site security service for the Texas site. Distributed database 901 processes its data to return the current hardware validation status of the virtual network elements executing at the Texas site—hardware valid. However, distributed database 901 automatically triggers upon the hardware invalidity for the CONF APN at the Oregon site and automatically transfers an alarm to the network control server. The alarm typically includes the associated metadata for the hardware validation failure.

Distributed database 901 receives a query from a business computer associated with the service DEXAMPLE.COM. Distributed database 901 processes its data to return the current hardware validation status of the virtual network elements executing for DEXAMPLE.COM—hardware invalid. The response typically includes associated metadata for the hardware validation failure. Distributed database 901 also receives a query from a research hospital data system that uses a medical data service. Distributed database 901 processes its data to return the current hardware validation status of the virtual network elements executing for the medical data service—hardware valid. In some cases, the hardware validity data could be packaged with additional service and status data to provide a more comprehensive medical data service view to the research hospital.

Figure 11:
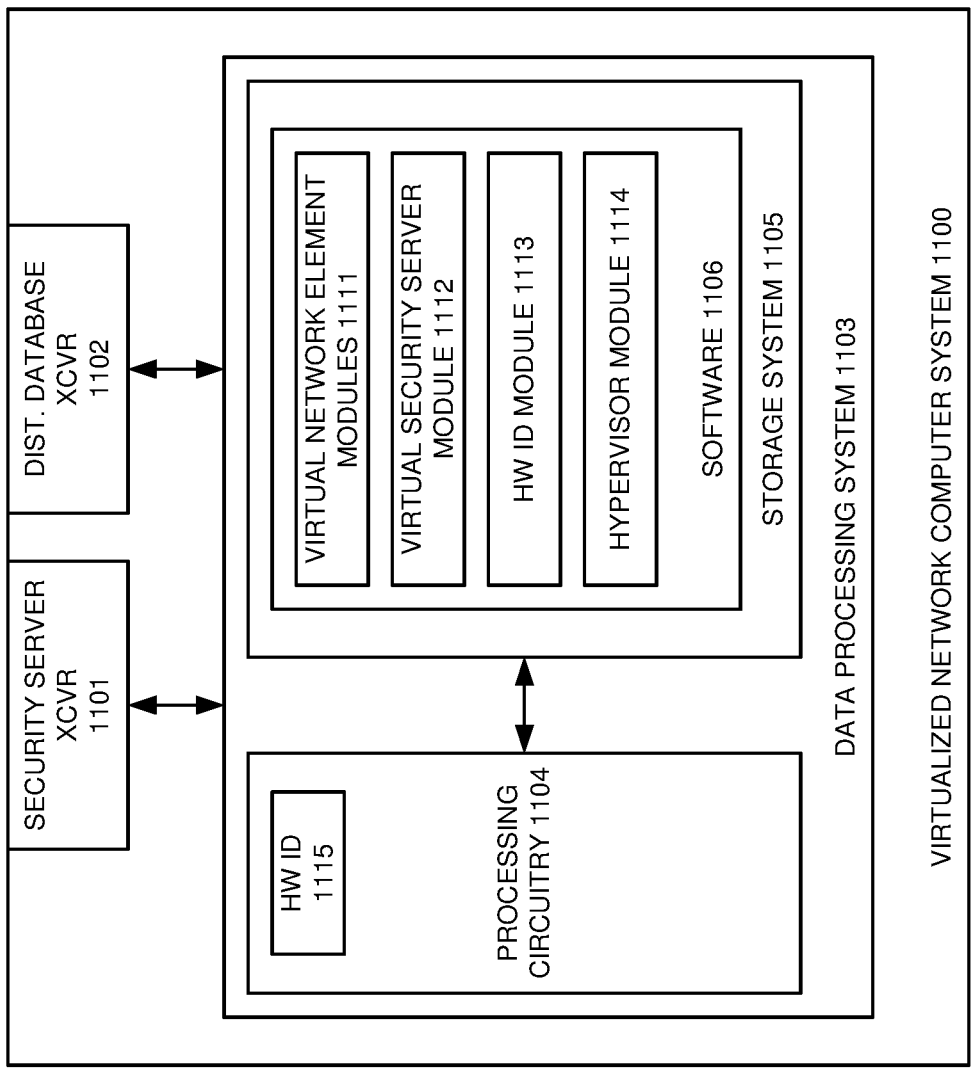
FIG. 11 illustrates a virtualized network computer system to validate hardware for executing virtual network elements.

FIG. 11 illustrates virtualized network computer system 1100 to validate hardware for executing virtual network elements. Virtualized network computer system 1100 is an example of computer systems 111-114, computer systems 411-414, and computer platform TX-547, although these computers may use alternative configurations and operations.

Virtualized network computer system 1100 comprises security server transceiver 1101 and distributed database 1101 transceiver 1102. Communication transceivers 1101-1102 comprise communication components, such as ports, bus interfaces, signal processors, memory, software, and the like. Communication transceivers 1101-1102 receive service and security data and transfer hardware validation data in association with the service and security data.

Virtualized network computer system 1100 comprises data processing system 1103. Data processing system 1103 comprises processing circuitry 1104 and storage system 1105. Processing circuitry 1104 has an embedded machine-readable HW ID 1115. Storage system 1105 stores software 1106. Software 1106 includes software modules 1111-1114. Some conventional aspects of computer system 1100 are omitted for clarity, such as power supplies, enclosures, and the like. Virtualized network computer system 1100 may be centralized or distributed and includes various virtualized components.

In data processing system 1103, processing circuitry 1104 comprises server blades, circuit boards, bus interfaces and connections, integrated circuitry, and associated electronics. Storage system 1105 comprises non-transitory, machine-readable, data storage media, such as flash drives, disc drives, memory circuitry, tape drives, servers, and the like. Software 1106 comprises machine-readable instructions that control the operation of processing circuitry 1104 when executed. Software 1106 includes software modules 1111-1114 and may also include operating systems, applications, data structures, virtual machines, utilities, databases, and the like. All or portions of software 1106 may be externally stored on one or more storage media, such as circuitry, discs, tape, and the like.

When executed by processing circuitry 1104, virtual network element modules 1111 direct circuitry 1104 to transfer user data packets for users in addition to associated data services. When executed by processing circuitry 1104, virtual server security module 1112 directs circuitry 1104 to interface with network security servers, hypervisor module 1114, and distributed databases to validate HW ID 1115 for virtual network element modules 1111. When executed by processing circuitry 1104, HW ID module 1113 directs circuitry 1104 to read HW ID 1115 and generate corresponding data. Typically, HW ID module 1113 and/or hypervisor module 1114 directs circuitry 1104 to read the ID and generate the HW ID data in a trust mode that is physically isolated from untrusted systems and interfaces. When executed by processing circuitry 1104, hypervisor module 1114 directs circuitry 1104 to execute virtual network element modules 1111 and virtual security server module 1112 in different processing time cycles, execute HW ID modules 1113 in targeted processing time cycles, perform context switching, and pass data between modules 1112-1113.

Figure 12:
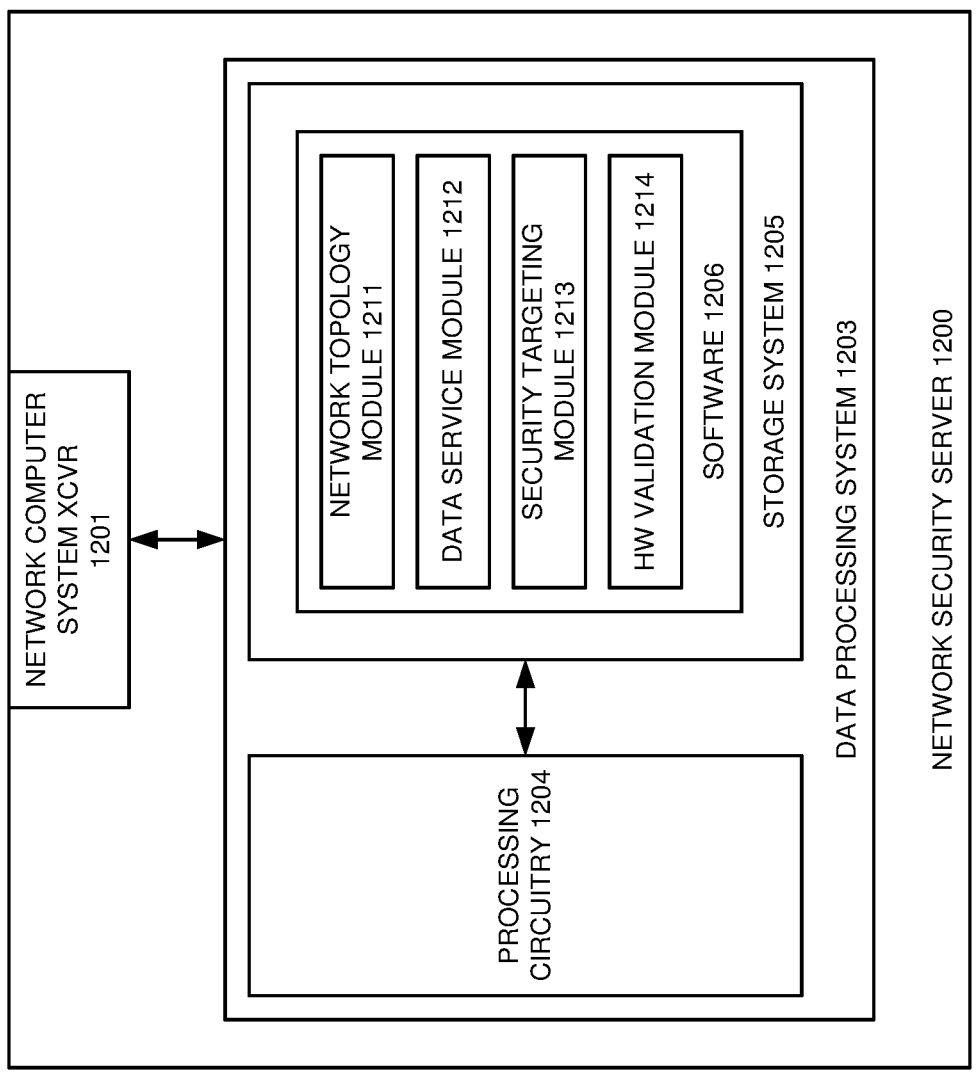
FIG. 12 illustrates a network security server to validate hardware for executing virtual network elements.

FIG. 12 illustrates network security server 1200 to validate hardware for executing virtual network elements. Network security server 1200 is an example of security servers 141-144, the vSECs in systems 400 and 500, and network security server 601, although these servers may use alternative configurations and operations. Network security server 1200 comprises network computer system transceiver 1201. Communication transceiver 1201 comprises communication components, such as ports, bus interfaces, signal processors, memory, software, and the like. Communication transceiver 1201 exchanges service data, security data, and hardware validation data with network computer systems.

Network security server 1200 comprises data processing system 1203. Data processing system 1203 comprises processing circuitry 1204 and storage system 1205. Storage system 1205 stores software 1206. Software 1206 includes software modules 1211-1214. Some conventional aspects of server 1200 are omitted for clarity, such as power supplies, enclosures, and the like. Network security server 1200 may be centralized or distributed and include various virtualized components.

In data processing system 1203, processing circuitry 1204 comprises server blades, circuit boards, bus interfaces and connections, integrated circuitry, and associated electronics. Storage system 1205 comprises non-transitory, machine-readable, data storage media, such as flash drives, disc drives, memory circuitry, tape drives, servers, and the like. Software 1206 comprises machine-readable instructions that control the operation of processing circuitry 1204 when executed. Software 1206 includes software modules 1211-1214 and may also include operating systems, applications, data structures, virtual machines, utilities, databases, and the like. All or portions of software 1206 may be externally stored on one or more storage media, such as circuitry, discs, tape, and the like.

When executed by processing circuitry 1204, network topology module 1211 directs circuitry 1204 to maintain associations between sites, servers, virtual network elements, HW IDs, and the like. When executed by processing circuitry 1204, data service module 1212 directs circuitry 1204 to associate data services with domain names, APNs, virtual network elements, and the like. When executed by processing circuitry 1204, security targeting module 1213 directs circuitry 1204 to issue HW validation tasks to network computer systems for targeted services, names, elements, and the like. When executed by processing circuitry 1204, HW validation module 1214 directs circuitry 1204 to verify the returned hash results against expected and internally generated hash results and generate corresponding HW validation data.

Figure 13:
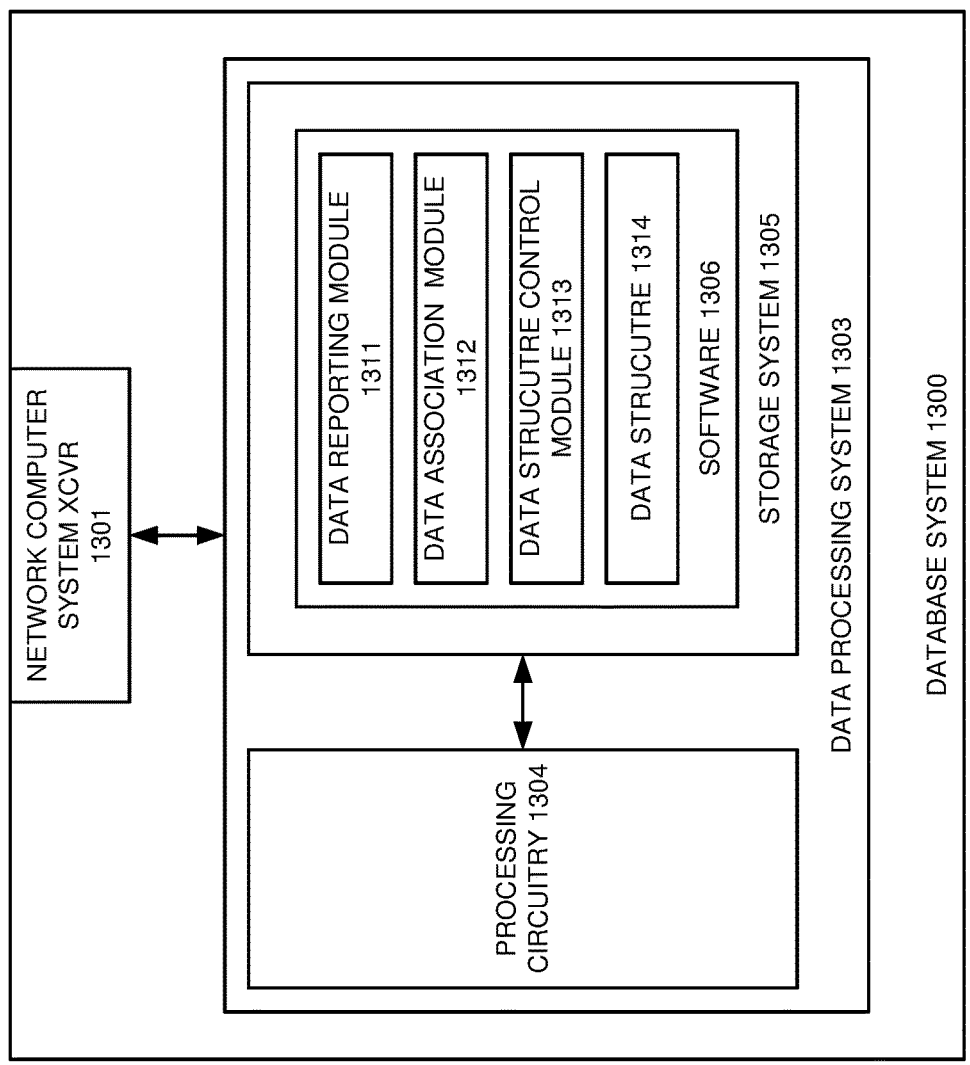
FIG. 13 illustrates a database system to indicate valid hardware for executing virtual network elements.

FIG. 13 illustrates database system 1300 to indicate valid hardware for executing virtual network elements. Database system 1300 is an example of computer systems 111-114, the vDBs in systems 400 and 500, and distributed database 901, although these database systems may use alternative configurations and operations.

Database system 1300 comprises network computer system transceiver 1301. Communication transceiver 1301 comprises communication components, such as ports, bus interfaces, signal processors, memory, software, and the like. Communication transceiver 1301 exchanges service data, security data, and hardware validation data with network computer systems.

Database system 1300 comprises data processing system 1303. Data processing system 1303 comprises processing circuitry 1304 and storage system 1305. Storage system 1305 stores software 1306. Software 1306 includes software modules 1311-1313 and data structure 1314. Some conventional aspects of database system 1300 are omitted for clarity, such as power supplies, enclosures, and the like. Database system 1300 may include various virtualized components.

In data processing system 1303, processing circuitry 1304 comprises server blades, circuit boards, bus interfaces and connections, integrated circuitry, and associated electronics. Storage system 1305 comprises non-transitory, machine-readable, data storage media, such as flash drives, disc drives, memory circuitry, tape drives, servers, and the like. Software 1306 comprises machine-readable instructions that control the operation of processing circuitry 1304 when executed. Software 1306 includes software modules 1311-1313 and may also include operating systems, applications, data structures, virtual machines, utilities, databases, and the like. All or portions of software 1306 may be externally stored on one or more storage media, such as circuitry, discs, tape, and the like.

When executed by processing circuitry 1304, data reporting module 1311 directs circuitry 1304 to receive security, validation, and service data. When executed by processing circuitry 1304, data association module 1312 directs circuitry 1304 to cross-correlate incoming data with the data existing in data structure 1314 by common services, APNs, URIs, sites, servers, time cycles, virtual machines, HW validation status, and the like. When executed by processing circuitry 1304, data structure control module 1313 directs circuitry 1304 to incorporate associated data into data structure 1314. When executed by processing circuitry 1304, data structure 1314 directs circuitry 1104 to indicate the various associations among data services, APNs, URIs, sites, servers, time cycles, virtual machines, HW validation status, and the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of securing a data communication network that has computer system hardware, the method comprising:
processing a virtual network element in the computer system hardware to forward data communications for multiple Uniform Resource Identifiers (URIs);
individually associating the virtual network element with the multiple URIs;
processing a hardware-embedded code in the computer system hardware to identify the computer system hardware for the virtual network element; and
validating the computer system hardware for the virtual network element, and when the validation fails, transferring hardware alarms for the multiple URIs associated with the virtual network element.

2. The method of claim 1 further comprising:
individually associating the virtual network element with multiple processing time cycles; and wherein
when the validation fails, transferring the hardware alarms comprises transferring the hardware alarms for the multiple processing time cycles associated with the virtual network element.

3. The method of claim 1 further comprising:
individually associating the virtual network element with multiple Access Point Names (APNs); and wherein
when the validation fails, transferring the hardware alarms comprises transferring the hardware alarms for the multiple APNs associated with the virtual network element.

4. The method of claim 1 further comprising:
individually associating the virtual network element with multiple physical sites; and wherein
when the validation fails, transferring the hardware alarms comprises transferring the hardware alarms for the multiple physical sites associated with the virtual network element.

5. The method of claim 1 wherein the virtual network element comprises a wireless access point.

6. The method of claim 1 wherein the virtual network element comprises a data gateway.

7. The method of claim 1 wherein the virtual network element comprises a residential server.

8. The method of claim 1 wherein the virtual network element comprises a media server.

9. The method of claim 1 wherein the virtual network element comprises a border controller.

10. The method of claim 1 wherein the virtual network element comprises an Internet Protocol Multimedia Subsystem (IMS) server.

11. The method of claim 1 wherein the virtual network element comprises a Mobility Management Entity (MME).

12. The method of claim 1 wherein the virtual network element comprises a Policy Charging and Rules Function (PCRF).

13. The method of claim 1 wherein the virtual network element comprises a Home Subscriber System (HSS).

14. The data communication network of claim 11 wherein the virtual network element comprises a Baseband Unit (BBU).

15. The method of claim 1 wherein the virtual network element comprises a Radio Resource Control (RRC) processor.

16. The method of claim 1 wherein the virtual network element comprises a Radio Link Control (RLC) processor.

17. The method of claim 1 wherein the virtual network element comprises a Packet Data Convergence Protocol (PDCP) processor.

18. The method of claim 1 wherein the virtual network element comprises a Media Access Control (MAC) processor.

19. The method of claim 1 wherein the virtual network element comprises a Dynamic Host Control Protocol (DHCP) server.

20. The method of claim 1 wherein the virtual network element comprises a Network Address Translation (NAT) firewall.

* * * * *